United States Patent [19]
Greenwood et al.

[11] 3,839,197
[45] Oct. 1, 1974

[54] CONTROLLED INTER-REACTOR CATALYST TRANSPORT METHOD

[75] Inventors: Arthur R. Greenwood, Niles; Richard L. Stevens, Elk Grove Village; Daniel G. Plackmann, Palatine; Wesley L. Kiel, Des Plaines, all of Ill.

[73] Assignee: Universal Oil Products Company, Des Plaines, Ill.

[22] Filed: Aug. 9, 1973

[21] Appl. No.: 387,088

[52] U.S. Cl. .............................. 208/174, 23/288 G
[51] Int. Cl. ..................... C10g 11/16, C10g 35/12
[58] Field of Search ............... 208/174; 23/288 G

[56] References Cited
UNITED STATES PATENTS

| | | | |
|---|---|---|---|
| 2,414,373 | 1/1947 | Gerhold | 208/174 |
| 2,756,193 | 7/1956 | Bergstrom | 208/174 |
| 2,913,404 | 11/1959 | Lieffers et al. | 23/288 G |
| 2,958,650 | 11/1960 | Dart et al. | 208/174 |
| 3,647,680 | 3/1972 | Greenwood et al. | 23/288 G |
| 3,725,248 | 4/1973 | Greenwood et al. | 208/138 |

*Primary Examiner*—Herbert Levine
*Attorney, Agent, or Firm*—James R. Hoatson, Jr.; Robert W. Erickson; William H. Page, II

[57] ABSTRACT

Applicable to a multiple-stage catalytic reaction system, in which the plurality of stages assume a side-by-side configuration, and in each of which the catalyst particles are movable via gravity-flow, the present inventive concept affords the controlled transport of catalyst particles from one reaction stage, or zone, to another. The system is especially adaptable to be utilized in a multitude of high-pressure processes for the catalytic conversion of hydrocarbonaceous material, in which processes deactivated catalyst particles are either regenerated, or discarded for disposal or, ultimate recovery of the catalytically active metallic components.

11 Claims, 1 Drawing Figure

PATENTED OCT 1 1974    3,839,197
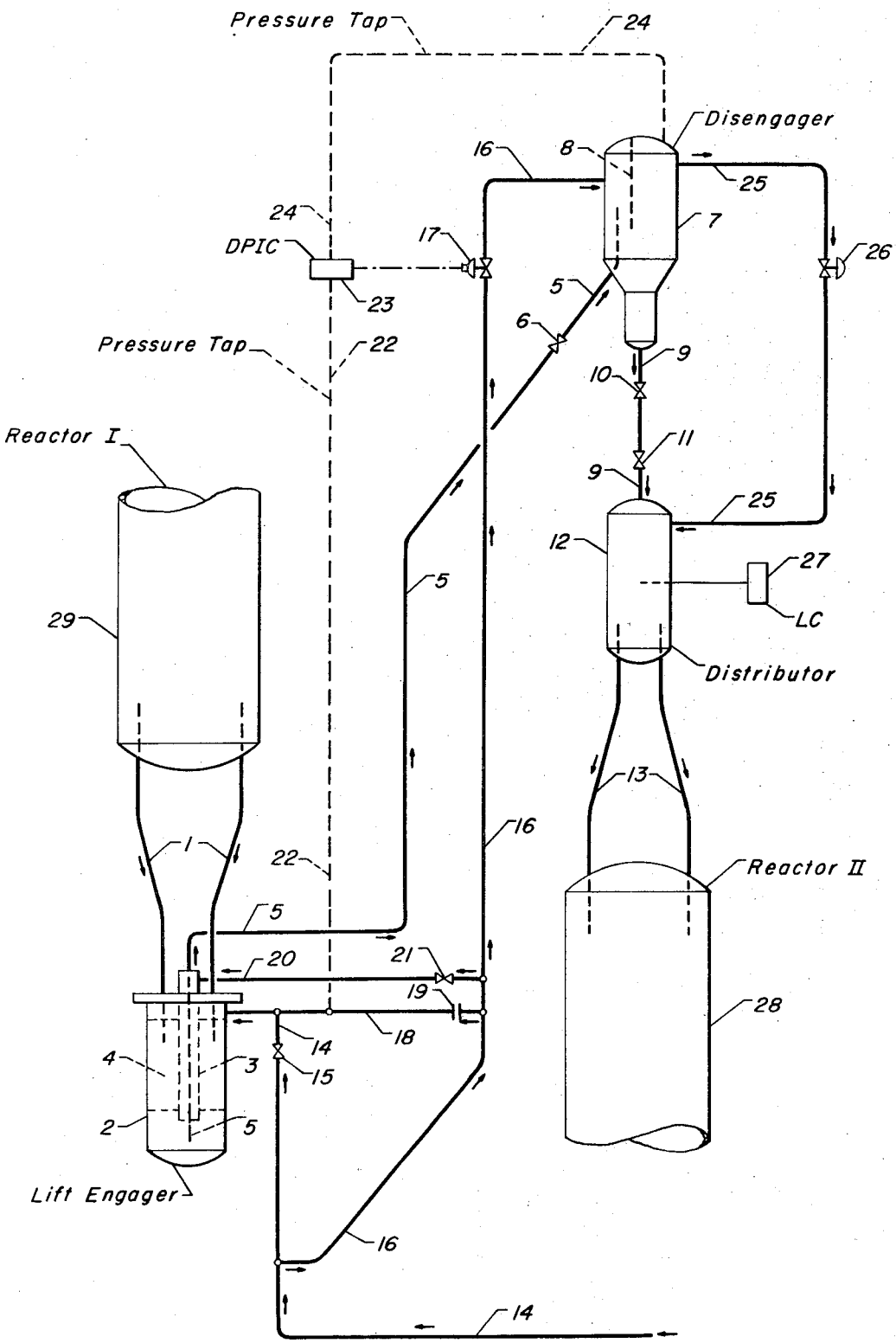

CONTROLLED INTER-REACTOR CATALYST TRANSPORT METHOD

APPLICABILITY OF INVENTION

The present invention is directed toward an improved means and method for effecting the conversion of a hydrocarbonaceous reactant stream in a multiple-stage, catalytic reaction system, wherein (1) the reactant stream flows serially through a plurality of reaction zones in side-by-side configuration and, (2) the catalyst particles are movable through each reaction zone via gravity-flow. More particularly, our inventive concept affords a controlled method of transferring catalyst particles from one of such reaction zones to another of the reaction zones. The present inter-reactor catalyst transport system is adaptable for utilization in processes wherein the conversion reactions are principally exothermic, or endothermic, and where the flow of the hydrocarbonaceous reactant stream, with respect to the direction of movement of the catalyst particles, is either countercurrent, or cocurrent.

Various types of multiple-stage reaction systems have found widespread utilization throughout the petroleum and petrochemical industries for effecting multitudinous reactions, and especially hydrocarbon conversion reactions. Such reactions are either exothermic, or endothermic, and include both hydrogen-producing and hydrogen-consuming reactions. Multiple-stage reaction systems are generally of two types: (1) side-by-side configuration, with intermediate heating and/or cooling between reaction zones, and wherein the reactant stream or mixture flows serially from one zone to another zone; and, (2) a stacked design wherein a single reaction chamber contains the multiple catalytic contact stages. Such systems, as applied to petroleum refining, have been employed to effect numerous hydrocarbon conversion reactions including those which are prevalent in catalytic reforming, fixed-bed alkylation, ethylbenzene dehydrogenation to produce styrene, other dehydrogenation processes, hydrorefining, isomerization, desulfurization, hydrocracking, hydrogenation, transalkylation, steam reforming for substitute natural gas production, etc. These reactions are effected in vapor-phase, liquid-phase or mixed-phase, principally depending upon the charge stock characteristics and the ultimately desired product slate. Our invention is intended for utilization in either a multiple-stage reaction system in side-by-side relation, or in a system where two or more catalytic contact zones are "stacked," with one or more additional reaction zones being in side-by-side relationship with the stack. Since catalyst particles which are movable through a reaction system by way of gravity-flow are necessarily moving in a downwardly direction, the present transport system contemplates the withdrawal of catalyst particles from a bottom portion of one reaction zone and the transport thereof to the top portion of a second reaction zone. Our invention is also applicable to reaction systems wherein the catalyst is disposed as an annular bed, or as a cylindrical bed of substantially the same cross-sectional area as the reaction vessel. The latter is not intended to preclude utilization of radial flow reactors that use scalloped screens at the interior wall of the reaction chamber. The flow of the reactant stream, serially from reaction zone to reaction zone, is preferably cocurrent with the movement of catalyst particles. In the interest of brevity, and not with the intent of unduly limiting our invention, the following discussion will be directed toward those systems wherein a downwardly moving bed of catalyst particles is employed in the cocurrent conversion of a hydrocarbonaceous reactant stream, with the catalyst particles being disposed in the form of an annular bed, through which the reactant stream flows laterally and radially.

A radial-flow reaction system generally consists of tubular-form sections, of varying nominal cross-sectional areas, vertically and coaxially disposed to form the reaction vessel. Briefly, the system comprises a reaction chamber containing a coaxially disposed catalyst-retaining screen, having a nominal, internal cross-sectional area less than said chamber, and a perforated centerpipe having a nominal, internal cross-sectional area less than the catalyst-retaining screen. The reactant stream is introduced, preferably in vapor phase, into the annular-form space created between the inside wall of the chamber and the outside surface of the catalyst-retaining screen. The latter forms an annular-form, catalyst-holding zone with the outside surface of the perforated centerpipe; vaporous reactant flows laterally and radially through the screen and catalyst zone into the centerpipe and out of the reaction chamber. Judicious design and operating considerations obviously require that the openings both in the centerpipe and the catalyst-retaining screen be sized to restrict the passage therethrough of catalyst particles. Although the tubular-form configuration of the various reactor components may take any suitable shape — i.e., triangular, square, oblong, diamond, etc. — many design, fabrication and technical considerations indicate the advantages of using components which are substantially circular in cross-section.

OBJECTS AND EMBODIMENTS

A principal object of our invention is to provide a controlled inter-reactor catalyst transport system for utilization in a multiple-stage catalytic process. A corollary objective is to provide an improved method for effecting the withdrawal of solids from a reaction zone, in which the solids are movable by way of gravity-flow while also effecting the transport of the withdrawn solids to another reaction zone for introduction therein.

Another object of our invention resides in providing a controlled method for the transfer of catalyst particles from one catalytic reaction zone to another catalytic reaction zone, which zones are utilized in the conversion of a hydrocarbon reactant stream flowing serially therethrough, and which reaction zones are in a side-by-side relation.

Therefore, in a multiple-stage, catalytic reaction system, wherein (1) a hydrocarbonaceous reactant stream flows serially through a plurality of reaction zones in side-by-side relation and, (2) catalyst particles are movable through each reaction zone via gravity-flow; the method of transferring catalyst particles from one of said reaction zones to another of said reaction zones, which method comprises the steps of: (a) withdrawing catalyst particles from the bottom of a first reaction zone through a plurality of catalyst-withdrawal conduits; (b) introducing said catalyst particles, via said conduits, into an upper portion of a withdrawal and transport vessel while simultaneously and continuously introducing a first fluid purge stream into said vessel, flowing said purge stream countercurrently through said conduits to strip hydrocarbons therefrom; (c) when the level of catalyst particles in said transport vessel contacts the discharge end of said conduits, automatically terminating the flow of catalyst particles therethrough, introducing a second fluid lift stream downwardly into an annular space formed by imperforate first and second concentric centerpipes, disposed in said vessel, at a velocity sufficient to lift said catalyst particles upwardly through the inner concentric centerpipe and out of said transport vessel; (d) flowing the removed catalyst particles and said lift stream upwardly through a lift line and introducing the same into a fluid-solids disengaging vessel, therein separating said catalyst particles from said fluid lift stream and passing said lift stream into a catalyst distribution zone maintained at a lower pressure than said disengaging vessel; (e) when substantially all of the withdrawn catalyst particles have passed through said lift line into said disengaging vessel, (i) terminating the flow of said fluid lift stream, (ii) equalizing the pressure between said disengaging vessel and said catalyst distribution zone and, (iii) passing said catalyst particles through a valved conduit into said catalyst distribution zone; and (f) passing said catalyst particles through a plurality of catalyst-transfer conduits into the top portion of a second reaction zone.

In another embodiment, the velocity of said purge stream is increased, to a level which inhibits the flow of catalyst particles downwardly through said withdrawal conduits, substantially simultaneously with the introduction of said second fluid lift stream.

These, as well as other objects and embodiments, will become evident from the following, more detailed description of the controlled inter-reactor catalyst transport system and the method of transporting catalyst utilizing the same. In one such other embodiment, the differential pressure between said withdrawal and transport vessel, and said disengaging vessel is zero when said fluid lift stream is introduced into the transport vessel.

PRIOR ART

Candor compels recognition of the fact that various types of processes utilize multiple-stage reaction systems, either in side-by-side configuration, as a vertically disposed stack or a combination of a stacked system in side-by-side relation with one or more separate reaction zones. Such systems as applied to petroleum refining, may be employed in a wide variety of hydrocarbon conversion reactions including catalytic reforming, fixed-bed alkylation, hydrorefining, hydrocracking, dehydrogenation, hydrogenation, steam reforming, etc. While our inventive concept is applicable to all the foregoing processes, through the reaction system of which the catalyst particles are movable via gravity-flow, the same will be additionally described, in part, in conjunction with the well-known catalytic reforming process. It is understood, however, that the controlled inter-reactor catalyst transport system affords a distinct improvement in other hydrocarbon conversion processes where characterized by a moving bed of gravity-flowing catalyst particles.

Historically, the catalytic reforming process was effected in a non-regenerative, fixed-bed system comprising a plurality of reaction zones in side-by-side relation. When the catalytic composite had become deactivated to the extent that continuous operation was no longer economically feasible, the entire unit was shut down, and the catalyst regenerated in situ. After several such regenerations, the catalyst was replaced with fresh catalyst and the deactivated catalyst subjected either to a reconditioning technique, or to an involved method for the recovery of the catalytically active metals. Of more recent vintage is the so-called "swing bed" system in which an extra reactor is substituted for one which is due to be placed off-stream for regeneration purposes. This type of system gained wide acceptance, in many refining processes, notwithstanding the required increase in catalyst inventory, in view of the fact that the entire unit was not caused to be shut down except for major operational upsets, or periodic turn-arounds for maintenance purposes. Still more recently, a "stacked" reactor system has been provided in which the catalyst particles flow, via gravity, downwardly from one catalyst-containing zone to another. Ultimately, the catalyst is transferred to a suitable regeneration system, also preferably functioning with a downwardly moving bed of catalyst. In effect, the catalyst particles are maintained within the reaction system, being transferred from one section to another in a manner such that the flow of particles is continuous, at frequent intervals, or at extended intervals, with the movement being controlled by the quantity of catalyst withdrawn from the last of the series of individual reaction zones.

Illustrative of a reaction zone, wherein the reactant stream is caused to flow laterally and radially through the catalyst, is that described in U.S. Pat. No. 2,683,654 (Cl. 23–288). The type of reactor shown is intended for the common fixed-bed system wherein the catalyst is either subjected to in situ regeneration, or is replaced. This type of reaction zone can be appropriately modified to provide a downwardly moving bed of catalyst particles.

U.S. Pat. No. 3,470,090 (Cl. 208–138) illustrates a side-by-side reaction system having intermediate heating of the reactant stream which flows serially through the reaction zones. Catalyst withdrawn from any of the reaction zones is sent to suitable regeneration facilities. This type of system can be modified such that the catalyst withdrawn from a given reaction zone is sent to the next succeeding reaction zone, while that catalyst withdrawn from the last reaction zone is transported to a suitable regeneration facility.

A stacked reaction zone configuration is shown in U.S. Pat. No. 3,647,680 (Cl. 208–65) as a two-stage system with an integrated regeneration facility which receives the catalyst withdrawn from the bottom reaction chamber. U.S. Pat. No. 3,692,496 (Cl. 23–288 G) and U.S. Pat. No. 3,725,249 (Cl. 208–139) both illustrate a similar stacked configuration. These stacked systems can be modified to include a reaction zone in side-by-side relation with the stack, which reaction zone receives the catalyst withdrawn from the bottom of the stack.

U.S. Pat. No. 3,725,248 (Cl. 208–138) is illustrative of a multiple-stage system in side-by-side configuration, with gravity-flowing catalyst particles being transported from the bottom of one reaction zone to the top of the next succeeding reaction zone, those particles being removed from the last reaction zone being transported to suitable regeneration facilities.

SUMMARY OF INVENTION

As hereinbefore set forth, the catalyst transport system of the present invention is suitable for utilization in a multitude of hydrocarbon conversion processes, and is especially directed to those in which a hydrocarbonaceous reactant stream flows serially through a plurality of reaction zones which are situated in a side-by-side configuration. For the sole purpose of additional illustration, and not with the intent of limiting applicability of our invention, the following discussion is primarily directed toward the catalytic reforming of naphtha fractions and/or distillates. Catalytic reforming, as well as the other processes previously set forth, has gone through several development phases which have currently terminated in a reaction system wherein the catalyst particles are in the form of a descending column in one or more reaction vessels. Typically, the catalytic composite is utilized in a substantially spherical form having a nominal diameter ranging from about one thirty-second inch to about one-eighth inch in order to afford free-flow characteristics which will not bridge, or block the descending column, or columns of catalyst within the overall system. A plurality of relatively small diameter catalyst-transfer conduits are employed to withdraw catalyst particles from one reaction zone, while a second plurality of such conduits are utilized to transfer the transported particles into the next succeeding reaction zone. In order to facilitate and enhance gravity-flow of the particles, it is particularly important that the same have a relatively small diameter, and one which is preferably less than about one-eighth inch. The conduits, whether for catalyst withdrawal, or catalyst transfer, are uniformly distributed throughout the cross-sectional area of the catalyst bed, and generally number from about 6 to about 16.

The catalytic reforming of hydrocarbons is generally effected in a vapor-phase operation at conditions which include catalyst temperatures in the range of about 700°F. to about 1,000°F. Other operating conditions include pressures from about 50 psig. to about 1,000 psig., liquid hourly space velocities from about 0.2 to about 10.0 and hydrogen to hydrocarbon mole ratios from about 1.0:1.0 to about 10.0:1.0. Reaction systems having catalyst particles which are movable therethrough via gravity-flow are particularly adaptable for low-pressure operation — i.e., from about 50 psig. to about 400 psig. In view of the fact that catalytic reforming reactions are principally endothermic in nature, the multiple-stage system will employ interstage heating of the effluent from a preceding zone, prior to the introduction thereof into the next succeeding zone.

The inter-reactor catalyst transport system, as hereinabove stated, is intended for use in a reaction system where the multiple-stage catalyst zones are in a side-by-side relation. Catalyst particles are withdrawn from the bottom of a first reaction zone, through a plurality of catalyst-withdrawal conduits, and are introduced thereby into the upper portion of a withdrawal and transport vessel. This vessel is sometimes referred to herein as a lift-engager, since it serves both the function of collecting the catalyst withdrawn and that of transporting the same to the next reaction zone. The lift-engager contains an imperforate centerpipe through the center of which a concentric lift line is disposed. The annular space created between the centerpipe and the interior wall of the lift-engager is divided into a plurality of collection zones of substantially equal volume, into each one of which, one catalyst-withdrawal conduit discharges. As the catalyst and each collection zone attains the level of the discharge end of the conduit, the flow of catalyst therethrough automatically terminates.

A fluid purge stream is continuously introduced into the annular space of the lift-engager and strips hydrocarbons from the catalyst particles through countercurrent contact therewith in the withdrawal conduits. When the flow of catalyst particles into the lift-engager ceases, a fluid lift stream is introduced downwardly into the annular space formed by the imperforate centerpipe and the concentric lift line disposed therein. Preferentially, both the fluid purge stream and the fluid lift stream are gaseous, and comprise hydrogen. Therefore, with respect to many hydrocarbon conversion processes, these streams will be a portion of the hydrogen-rich recycled gaseous phase separated from the product effluent. The velocity of the fluid lift stream, downwardly into the annular space formed between the concentric centerpipes, is sufficient to lift the catalyst particles from the bottom of the lift-engager upwardly through the inner concentric centerpipe (lift line) and out of the transport vessel.

Substantially simultaneously with the introduction of said fluid lift stream, the velocity of the continuous purge stream is increased to a level which inhibits the continued flow of catalyst particles downwardly through the withdrawal conduits, while previously withdrawn catalyst particles are being removed via the lift-engager. The velocity of the purge stream in the withdrawal conduits is less than that effecting a reversal of catalyst flow in the conduits, or a fluidization of the catalyst bed. The catalyst particles and lift stream flow upwardly through the lift line and are introduced into a fluid-solids disengaging vessel wherein catalyst particles are separated from the lift stream. The lift stream is then passed into a catalyst distribution zone which is at a pressure lower than that maintained in the disengaging vessel. When substantially all the withdrawn catalyst particles have passed through the lift line into the disengaging vessel, the flow of the fluid lift stream is terminated and the pressures in the disengaging vessel and the catalyst distribution zone are equalized. The catalyst particles pass through a valved conduit between the disengaging vessel and the catalyst distribution zone into the latter. A plurality of catalyst conduits are utilized to transfer the catalyst particles from the catalyst distribution zone into the top portion of the next succeeding reaction zone. The plurality of catalyst-transfer conduits, between the catalyst distribution zone and the next succeeding reaction zone, are uniformly distributed across the catalyst bed, much the same as the catalyst-withdrawal conduits are uniformly distributed across the cross-sectional area of the preceding reaction zone.

Substantially simultaneously with the termination of the lift stream, the continuous purge stream is decreased to about its original level, thus permitting more catalyst to be withdrawn from the first reaction zone. The emptying and refilling of the lift-engager insures that the same amount of catalyst is withdrawn through each withdrawal conduit.

In order to facilitate the smooth, uninhibited flow of catalyst particles throughout the entire system, cautious design considerations dictate a minimum of sharp turns, or bends wherever catalyst particles are flowing. Therefore, it is preferred that the withdrawal and transport vessel is coaxially disposed below the reaction zone from which the catalyst particles are withdrawn. Similarly, the vapor-solids disengaging vessel, catalyst distribution zone and the reaction zone to which the catalyst particles are transferred, are preferably coaxially disposed.

As hereinafter set forth in the description of the accompanying drawing, the above-described catalyst transport technique lends itself to programmed control which utilizes a unique logic system to provide for substantially continuous catalyst movement from one reaction zone to another, with each step being effected in its proper sequence. Within the transfer system, a portion of the entire catalyst inventory is subject to movement continuously with the exception of the time-delays built into the logic control for the purpose of insuring that certain steps, or stages have been completed. Similarly, with the same exception, catalyst particles will continually be moving, via gravity-flow, through one or more reaction zones depending upon the number in the entire multiple-stage process. Therefore, it can be said that the present inventive concept provides for the "continuous" inter-reactor transport of catalyst particles in a multiple-stage process.

DESCRIPTION OF DRAWING

Our controlled inter-reactor catalyst transport system will be described in greater detail with reference to the accompanying drawing. The drawing is presented as an extremely simplified schematic flow diagram in which only those lines, valves, etc., relevant to the flow of catalyst particles are shown. It is understood that the drawing is intended only for illustration, and is not construed as limiting our invention beyond the scope and spirit of the appended claims. The principal vessels indicated are the bottom portion of a catalytic conversion zone, shown as 29 and reactor I, the upper portion of a succeeding catalytic conversion zone, shown as 28 and reactor II, lift-engager 2, vapor-solids disengager 7 and catalyst distributor 12. Also illustrated is a Differential Pressure Indicator Controller 23 and a Level Control 27.

With specific reference now to the drawing, it will be assumed, for illustration purposes, that the pressure in reactor I is 318 psig., the pressure in lift-engager 2 and disengager 7 is also 318 psig. and the pressure in reactor II is about 290 psig. All valves are closed with the exception of control valves 17 and 26. The former is activated by DPIC 23, and is maintaining a zero pressure differential between lift-engager 2 and disengaging vessel 7. The latter, throughout the series of logic system-controlled steps, is always open in order to permit the passage of vaporous material from disengaging vessel 7 into catalyst distributor 12 by way of line 25. Recycle gas, rich in hydrogen, and preferably a portion of that separated from the ultimate conversion product effluent, is being introduced via line 14. In this step of the sequence, the recycled gas is diverted through line 16 and valve 17 into disengager 7. A portion of the hydrogen-rich gas is diverted from line 16 via line 18 containing restriction orifice 19; the flow through the orifice is continuous, and at a rate which purges hydrocarbons from the catalyst particles being withdrawn from reactor I. This situation constitutes step "O" (or "ready") in the logic-controlled sequence, during which catalyst particles are flowing from distributor 12, via catalyst-transfer conduits 13, into the upper portion of reactor II, and catalyst particles are either being withdrawn from reactor I, via catalyst-withdrawal conduits 1 into lift-engager 2, or the latter is filled, and catalyst flow through conduits 1 has automatically terminated. However, the flow of the purge medium through restriction orifice 19 and line 18 continues.

Lift-engager 2 contains two concentric centerpipes 3 and 5, the latter extending upwardly as a lift line, or catalyst-transport conduit. The main body of engager 2 is divided into catalyst-collecting sections of substantially equal volume by means of vertical baffles 4 which terminate both a finite distance above the bottom and below the top of engager 2. One each of catalyst-withdrawal conduits 1, generally numbering from six to sixteen extends into each catalyst-holding section to a point below the upper edge of baffles 4. As the catalyst particles in each of the vertical sections attains the discharge end of the conduit in communication therewith, flow through the individual conduit automatically terminates. Eventually, and virtually simultaneously, all the catalyst-holding sections are filled, and the removal of catalyst particles from reactor I ceases. This technique insures substantially uniform withdrawal of equal volumes of catalyst particles across the entire cross-sectional area of the catalyst bed disposed in reactor I.

Commencement of the next step (1) is triggered by Level Control 27 as the catalyst level in distributor 12 drops below the sensing point. The logic system then calls for valve 15, in line 14 to be open to the extent that the velocity of the purge stream through line 18 is increased to a level which prevents the continued flow of catalyst particles through conduits 1, while increasing the pressure in lift-engager 2 to about 323 psig. This step terminates after a time delay in which the increased flow through valve 15 is verified and DPIC 23 indicates a zero pressure differential with respect to vapor/solids disengager 7; that is, valve 17 opens wider to permit the pressure in disengager 7 to attain a level of 323 psig. Valve 26 is on flow control and the pressure in distributor 12 and reactor II continues to be about 290 psig. The increased flow of purge gas through valve 15, and lines 14 and 18, is below that level which would result in a reverse flow of catalyst particles through conduits 1.

When DPIC 23 indicates a zero pressure differential, via pressure taps 22 and 24, step (2) commences with valves 6 (in lift line 5) and 21 (in lift stream line 20) being opened. The lift gas stream flows through line 20 and valve 21 into the annular space created between centerpipe 3 and lift line 5, at a velocity approximately equal to the flow of gas via line 25 through valve 26. At this point, a solenoid valve (not illustrated), terminates the effect of DPIC 23 such that valve 17 is closed. The lift gas flows downwardly through the annular space and causes the catalyst particles to be lifted from the lower portion of lift-engager 2 upwardly through lift line 5, and into vapor-solids disengager 7. As the catalyst head increases in lift line 5, the pressure within disengager 7 decreases and approaches a level of about 320 psig. as the lift-engager empties and the lift line becomes about 10.0 percent full of catalyst particles throughout its length. Meanwhile, it must be noted that valve 26, in line 25, continues to be controlling such that the desired flow through lift line 5 is maintained. The pressure in distributor 12 and reactor II remains at about 290 psig., being a function only of the process flow pressure drop. When the catalyst is all removed from the lift-engager, lift line 5 starts being cleared of catalyst from the bottom up. When lift line 5 is completely cleared of catalyst, the hydrostatic head therein drops to zero and the pressure in disengager 7 returns to about 323 psig.

Disengager 7 is designed with a chordal baffle 8 which divides the disengager into two segmental sections of different cross-sectional area. The catalyst particles and lift gas are discharged upwardly into that section having the lesser cross-sectional area, and are caused to reverse direction, whle effecting a substantial decrease in the nominal linear velocity, which insures that all catalyst, including fines resulting from attrition, are separated from the vapors which are removed via line 25, and introduced thereby into distributor 12.

When the logic system determines that DPIC 23 again senses zero differential pressure, indicating the termination of the foregoing step (2), valves 6, 15 and 21 are closed to start step (3). Valve 17 remains closed since the solenoid continues to void the effect of DPIC 23. The pressure in lift-engager 2 decreases to the reactor I pressure of 318 psig. As the pressures within reactor I and lift-engager 2 equalize, catalyst particles will once again flow from the former through conduits 1 into the latter. Control valve 26, which is on flow control, goes wide open since all gas flow into disengager 7 has ceased. This serves to equalize the pressures within the disengager and distributor 12, a pressure of 290 psig. Step (3) terminates after another time delay insures that these pressures have been equalized.

At this point, step (4) commences with valve 11, in line 9, being opened, followed by the opening of valve 10, which permits the catalyst particles to be transferred into distributor 12, from which they flow into reactor II by way of transfer conduits 13. Another time delay terminates step (4) after sufficient time to insure that all the catalyst particles have been removed from disengager 7. At this point, step (5) commences with valve 10 being closed. To allow catalyst dust to settle, valve 11 remains open on another time delay, which terminates step (5). Step (6) starts with the closing of valve 11, and terminates when the valve is confirmed closed. At this point, all the valves are closed with the exception of 26 in line 25. At the termination of step (6), step (0) recommences with the solenoid being activated such that DPIC 23 once again effects a zero pressure drop between lift-engager 2 and disengager 7 at a level of about 318 psig., by opening valve 17, allowing gas to flow through line 16 to disengager 7. Control valve 26 will close partially and again be on flow control. When the logic system confirms that the pressure has been equalized, the "ready" step in the controlled sequence has been attained, and the cycle can be repeated in the manner above-described.

In those multiple-stage processes wherein there is an additional reactor (III), catalyst particles will be transferred thereto, from reactor II, by way of a transport system identical to that which has been described with respect to the transfer of catalyst particles from reactor I to reactor II. In a two-stage system, or in transferring catalyst particles from the last reactor in the series to a regeneration facility, the controlled transport system is modified to facilitate the transport of particles from a hydrogen atmosphere to the oxygen-containing atmosphere necessary for regeneration.

The foregoing is believed to illustrate the interreactor catalyst transport system of the present invention, as well as the controlled method for effecting the same.

We claim as our invention:

1. In a multiple-stage, catalytic reaction system, wherein (1) a hydrocarbonaceous reactant stream flows serially through a plurality of reaction zones in side-by-side relation and, (2) catalyst particles are movable through each reaction zone via gravity-flow; the method of transferring catalyst particles from one of said reaction zones to another of said reaction zones, which method comprises the steps of:
   a. withdrawing catalyst particles from the bottom of a first reaction zone through a plurality of catalyst-withdrawal conduits;
   b. introducing said catalyst particles, via said conduits, into an upper portion of a withdrawal and transport vessel while simultaneously and continuously introducing a first fluid purge stream into said vessel, flowing said purge stream countercurrently through said conduits to strip hydrocarbons therefrom;
   c. when the level of catalyst particles in said transport vessel contacts the discharge end of said conduits, automatically terminating the flow of catalyst particles therethrough, introducing a second fluid lift stream downwardly into an annular space formed by imperforate first and second concentric centerpipes, disposed in said vessel, at a velocity sufficient to lift said catalyst particles upwardly through the inner concentric centerpipe and out of said transport vessel;
   d. flowing the removed catalyst particles and said lift stream upwardly through a lift line and introducing the same into a fluid-solids disengaging vessel, therein separating said catalyst particles from said fluid lift stream and passing said lift stream into a catalyst distribution zone maintained at a lower pressure than said disengaging vessel;
   e. when substantially all of the withdrawn catalyst particles have passed through said lift line into said disengaging vessel, (i) terminating the flow of said fluid lift stream, (ii) equalizing the pressure between said disengaging vessel and said catalyst distribution zone and, (iii) passing said catalyst particles through a valved conduit into said catalyst distribution zone; and,
   f. passing said catalyst particles through a plurality of catalyst-transfer conduits into the top of a second reaction zone.

2. The method of claim 1 further characterized in that the velocity of said purge stream is increased, to a level which inhibits the flow of catalyst particles downwardly through said withdrawal conduits, substantially simultaneously with the introduction of said fluid lift stream.

3. The method of claim 2 further characterized in that said increased level is below that effecting a reversal of catalyst flow in said withdrawal conduits.

4. The method of claim 2 further characterized in that the velocity of said purge stream is decreased to about its former level following the termination of the flow of said lift stream.

5. The method of claim 1 further characterized in that the differential pressure between said withdrawal and transport vessel, and said disengaging vessel is zero when said fluid lift stream is introduced.

6. The method of claim 1 further characterized in that the pressure between said disengaging vessel and said transport vessel is equalized after said catalyst particles have been introduced into said catalyst distribution zone.

7. The method of claim 6 further characterized in that the valved conduit between said disengaging vessel and said catalyst distribution zone is closed prior to equalizing the pressure between said transport and disengaging vessels.

8. The method of claim 1 further characterized in that said fluid purge and lift streams are gaseous.

9. The method of claim 8 further characterized in that said gaseous purge and lift streams comprise hydrogen.

10. The method of claim 1 further characterized in that said first reaction zone and transport vessel are co-axially disposed.

11. The method of claim 1 further characterized in that said second reaction zone, disengaging vessel and catalyst distribution zone are coaxially disposed.

* * * * *